(12) United States Patent
Liao

(10) Patent No.: US 6,354,618 B1
(45) Date of Patent: Mar. 12, 2002

(54) FOLDING BICYCLE

(76) Inventor: Daocheng Liao, Jincheng Factory, Jinquianling Industrial Zone, Jidigang, Huangjiang County, Dongguan City, Guangdong Province, 523757 (CN)

( * ) Notice: Subject to any disclaimer, the term of this patent is extended or adjusted under 35 U.S.C. 154(b) by 0 days.

(21) Appl. No.: 09/612,385

(22) Filed: Jul. 7, 2000

(30) Foreign Application Priority Data

| Jul. 9, 1999 | (CN) | 99216333 U |
|---|---|---|
| Jan. 24, 2000 | (CN) | 00202940 U |
| Jan. 31, 2000 | (CN) | 00203123 U |
| May 22, 2000 | (CN) | 00228206 U |
| May 22, 2000 | (CN) | 00228207 U |

(51) Int. Cl.$^7$ .............................................. B62K 3/02
(52) U.S. Cl. ...................................... 280/287; 280/278
(58) Field of Search ............................. 280/287, 281.1, 280/278

(56) References Cited

U.S. PATENT DOCUMENTS

| 3,807,762 A | * | 4/1974 | Ogisu | 280/287 |
| 4,202,561 A | * | 5/1980 | Yonkers | 280/278 |
| 4,824,130 A | * | 4/1989 | Chiu | 280/239 |
| 4,909,537 A | * | 3/1990 | Tratner | 280/278 |

* cited by examiner

*Primary Examiner*—Kevin Hurley
(74) *Attorney, Agent, or Firm*—Foley & Lardner

(57) ABSTRACT

A folding bicycle includes two handlebars (1) which can fold from an operative position to a storage position; a girder including a front pipe (11), a girder axle core (12) and a girder axle sleeve (13); a front fork standpipe (9); a front wheel (10); a rear wheel (32); a saddle (16); and pedals. The girder axle core (12), whose front end is connected with the front pipe (11), may move fore-and-aft inside the girder axle sleeve (13). The front fork standpipe (9) which extends through the girder front pipe (11) for supporting the front wheel (10), may rotate around an axis thereof. The axis of the girder front pipe (11) is located rear of an axis of rotation of the front wheel (10) so that the front wheel (10) can be rotated and folded backward so as to extend along beside the girder axle core (12) when the handlebars are folded in their storage position.

8 Claims, 16 Drawing Sheets

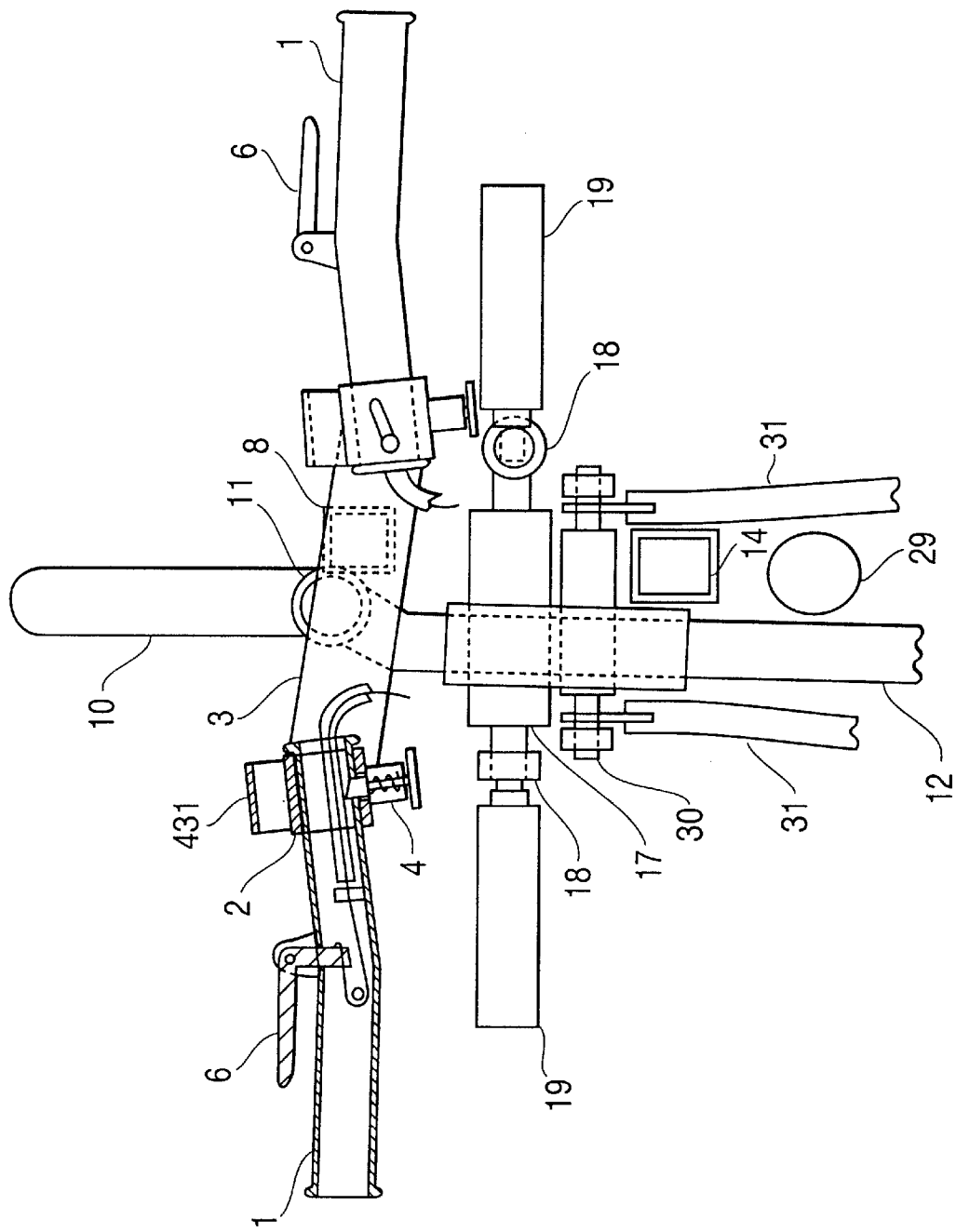

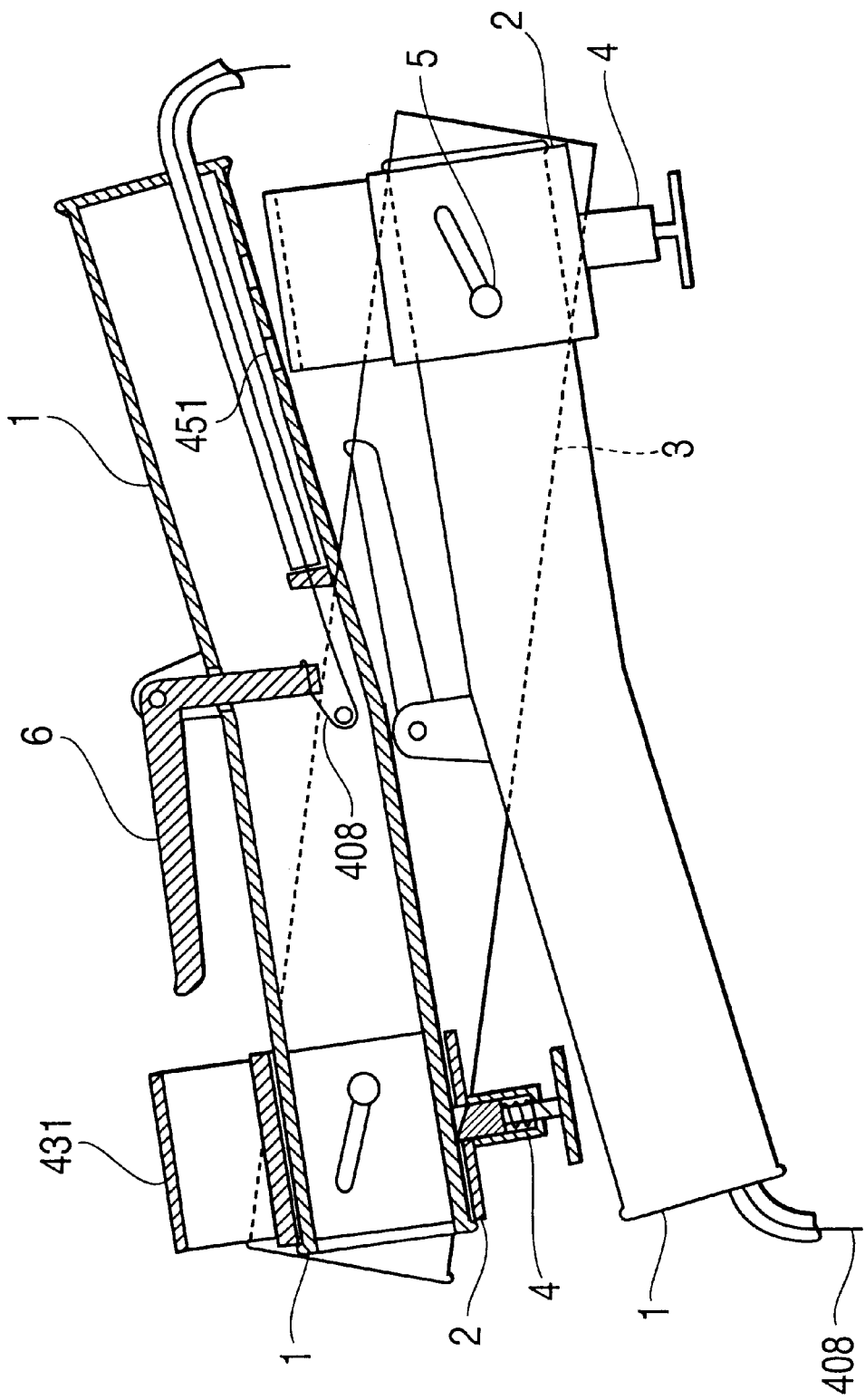

FOLDING BICYCLE

The present invention relates to a bicycle, and more particularly to a folding bicycle.

BACKGROUND OF THE INVENTION

With the development of the society, more and more new-fashioned transport devices appear and traffic itself becomes more and more advanced. However, the traditional bicycles are not thus washed up and have undergone great developments instead. People always get rid of the stale and bring forth the fresh as things advance. In urban area, people have a desired for bicycles to occupy minimum spaces if it is possible due to the limited space available in such environments. It is also expected that bicycles could be made to consume a minimum volume for convenience. On the other hand, bicycles must meet people's need for riding and loading, therefore, the size cannot be reduced much below that of conventional machines. This therefore, requires that bicycles that can be folded.

SUMMARY OF THE INVENTION

An object of the present is to provide a folding bicycle so as to reduce its occupied space and to be convenient for parking and carrying.

According to the invention, a folding bicycle comprises handlebar means comprising handlebars; girder means comprising a front pipe 11, a girder axle core 12 and a girder axle sleeve 13; a front fork standpipe 9; a fore wheel 10; a rear wheel 32; a saddle 16; and pedal means, wherein the girder axle core 12, whose front end is connected with the front pipe 11, may move fore-and-aft inside the girder axle sleeve 13; the front fork standpipe 9 is disposed through the girder front pipe 11 for supporting the fore (front) wheel 10 so that it may rotate around the axis thereof; and the axis of the girder front pipe 11 is vertically in the back of the fore wheel's 10 axis so that the front wheel 10 can be rotated and folded backward.

In the folding bicycle according to this invention, the pedal means and handlebar means may also be folded.

The bicycle according to the invention may be folded by means of moving the girder axle core as well as the fore wheel backward, putting the front wheel under the rear wheel's frame or placing the front wheel parallel with the rear wheel. Furthermore, the pedal means, the handlebar means and the saddle can be folded.

BRIEF DESCRIPTION OF THE DRAWINGS

FIG. 4 is a magnifying plan view in part showing handlebar means, a girder, a saddle axle sleeve and a medial axle.

FIG. 8 is a plan view showing the folded handlebar means according to the present invention.

FIG. 20b is a view showing the folded handlebar means in FIG. 20a.

FIG. 20c is the view showing the U-shaped frame of the handlebar means in FIG. 20a.

DETAILED DESCRIPTION OF THE INVENTION

Figure 1:
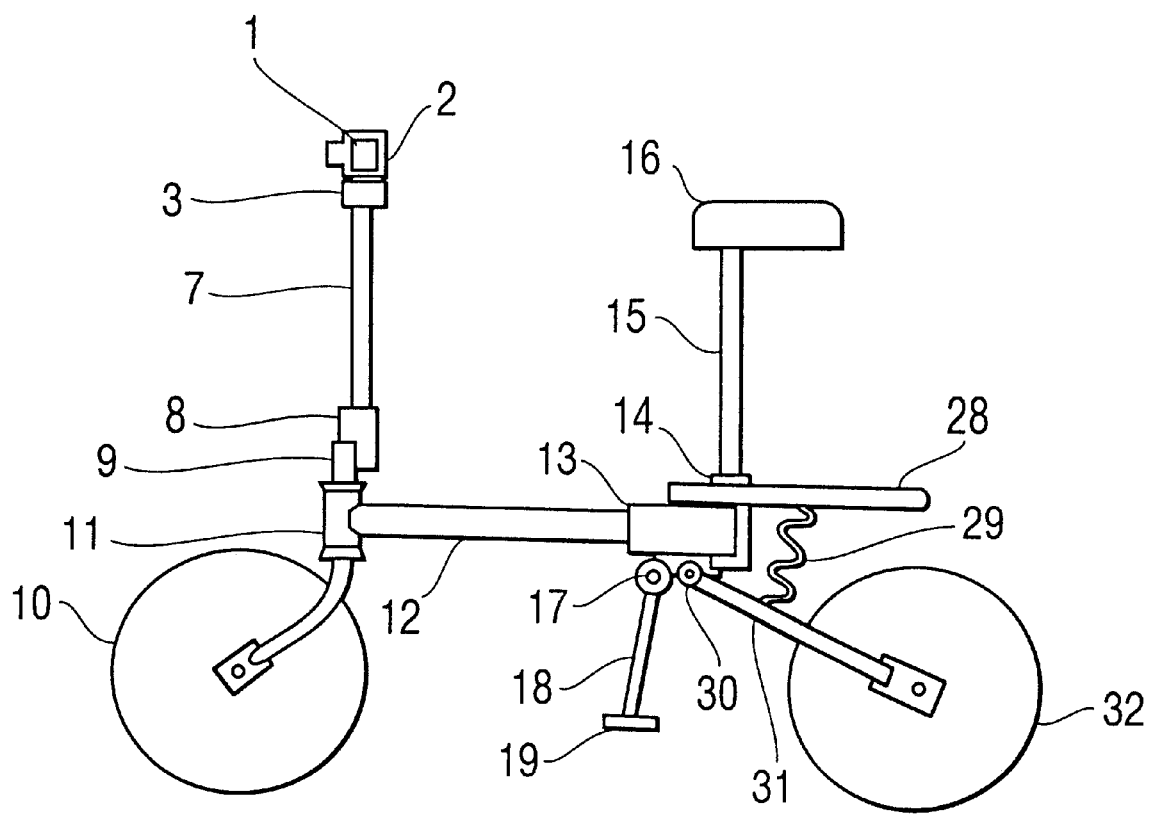
FIG. 1 is a side view showing a folding bicycle according to the present invention in the outspread or operational state.
Figure 2:
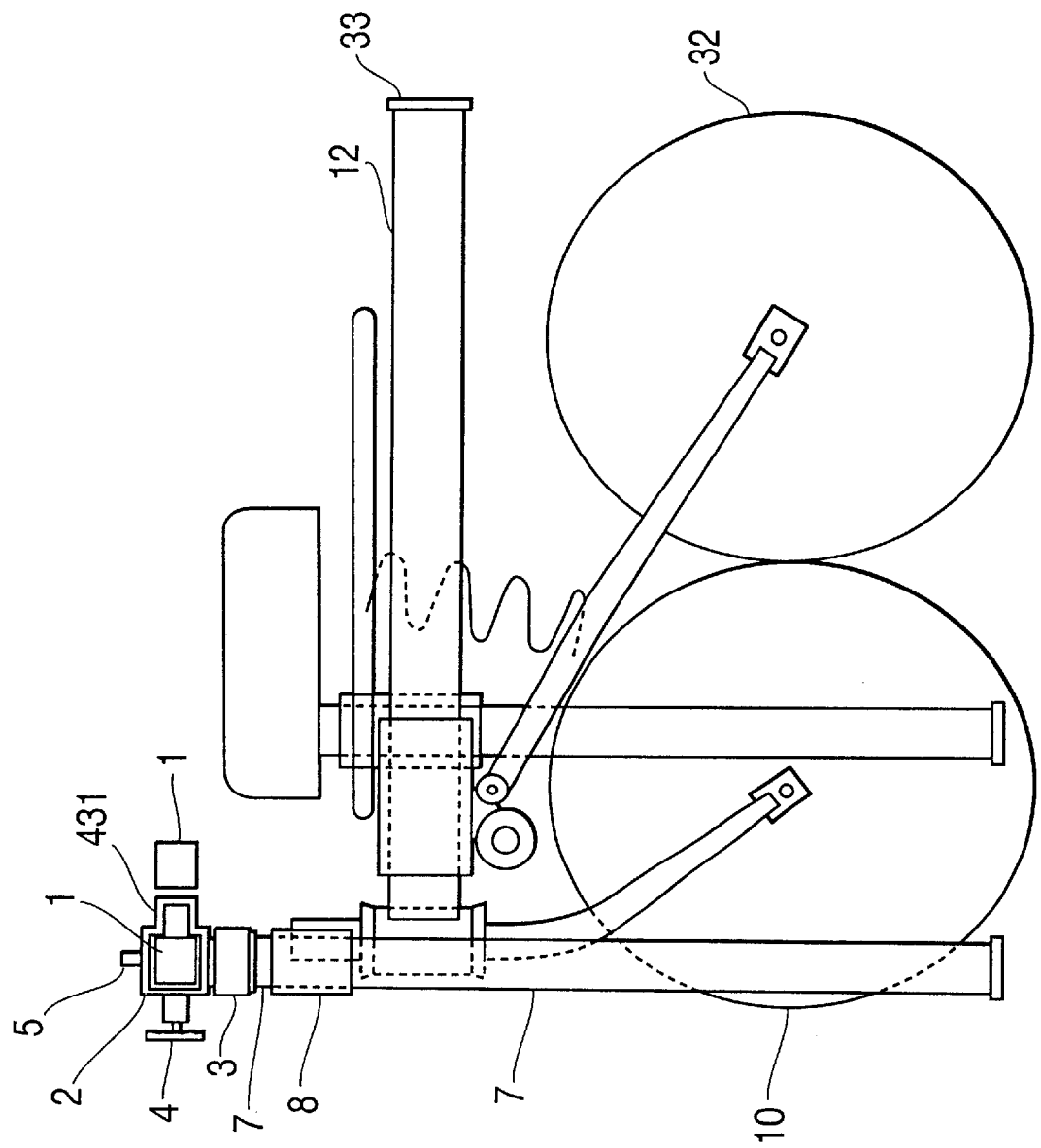
FIG. 2 is a side view showing a folding bicycle according to the present invention in a completely folded state.
Figure 3:
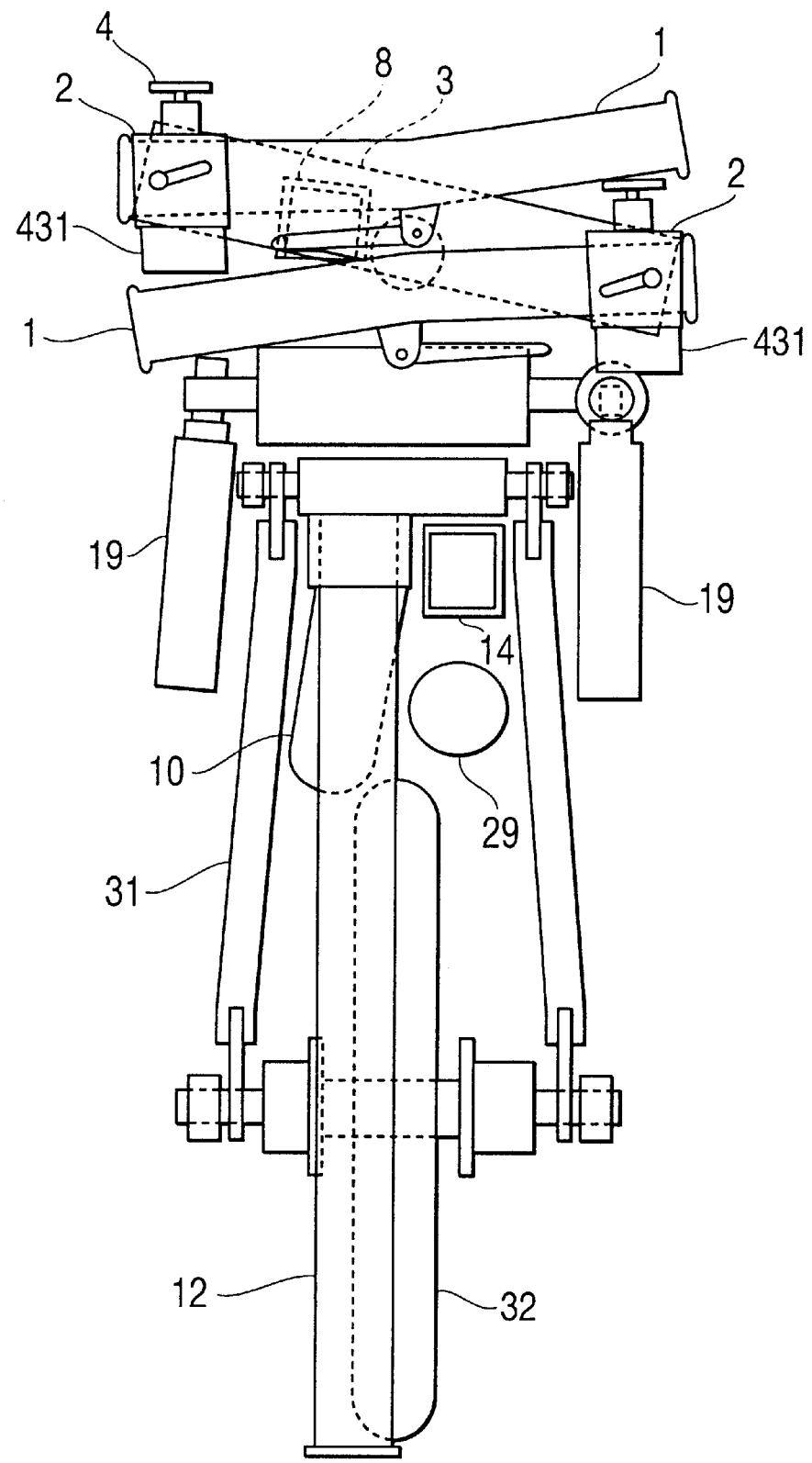
FIG. 3 is a plan view showing a folding bicycle according to the present invention in a completely folded state.

The present invention will be explained in detail in conjunction with the accompanying drawings.

With reference to FIG. 1 to FIG. 4, a folding bicycle according to the invention comprises handlebar means comprising handlebars; girder means comprising a front pipe 11, a girder axle core 12 and a girder axle sleeve 13; a front fork standpipe 9; a fore wheel 10; a rear wheel 32; a saddle 16; and pedal means, wherein the girder axle core 12, whose front end is connected with the front pipe 11, may move fore-and-aft inside the girder axle sleeve 13; the front fork standpipe 9 through the girder front pipe 11 for supporting the fore wheel 10 may rotate around the axis thereof; and the axis of the girder front pipe 11 is vertically in the back of the fore wheel's 10 axis so that the front wheel 10 can be rotated and folded backward.

The handlebar means comprises a handlebar axle core 7 and handlebar axle sleeves 8 in which the handlebar axle core 7 can move up and down; and the saddle 16 comprises a saddle axle core 15 and saddle axle sleeves 14 in which the saddle axle core 15 can move up and down.

The structure of the bicycle's body is set forth as follows: a carrying rack 28, a girder axle sleeve 13 and a saddle axle sleeve 14, a medial axle 17 and the axle sleeve of a handing axle 30 are connected. The two ends of the axle core of the hanging axle 30 are connected with the rear wheel bracket 31. A hanging spring 29 withstands between a rear wheel bracket 31 and the carrying rack 28. The front end of the girder axle core 12 joins with the front pipe 11 of the girder, The front fork standpipe 9 links up with the handlebar axle sleeve 8 in parallel.

Figure 5A:
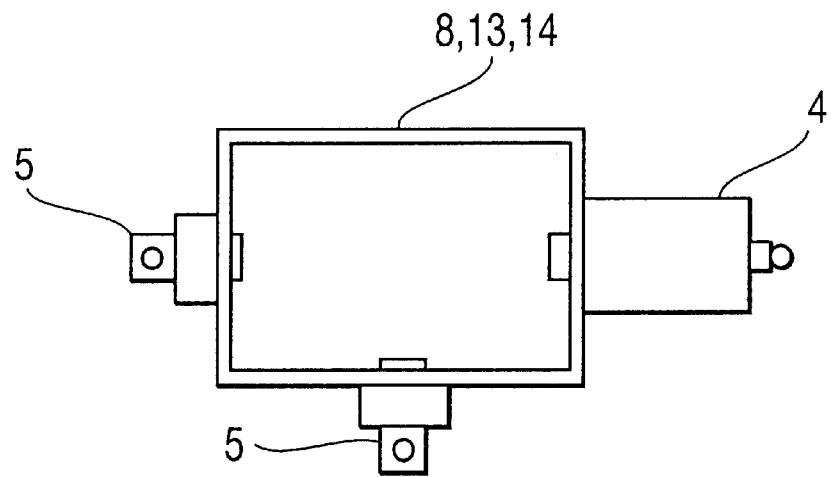
FIGS. 5a, 5b are views showing handlebar means, a girder and a saddle in the folded state.
Figure 5B:
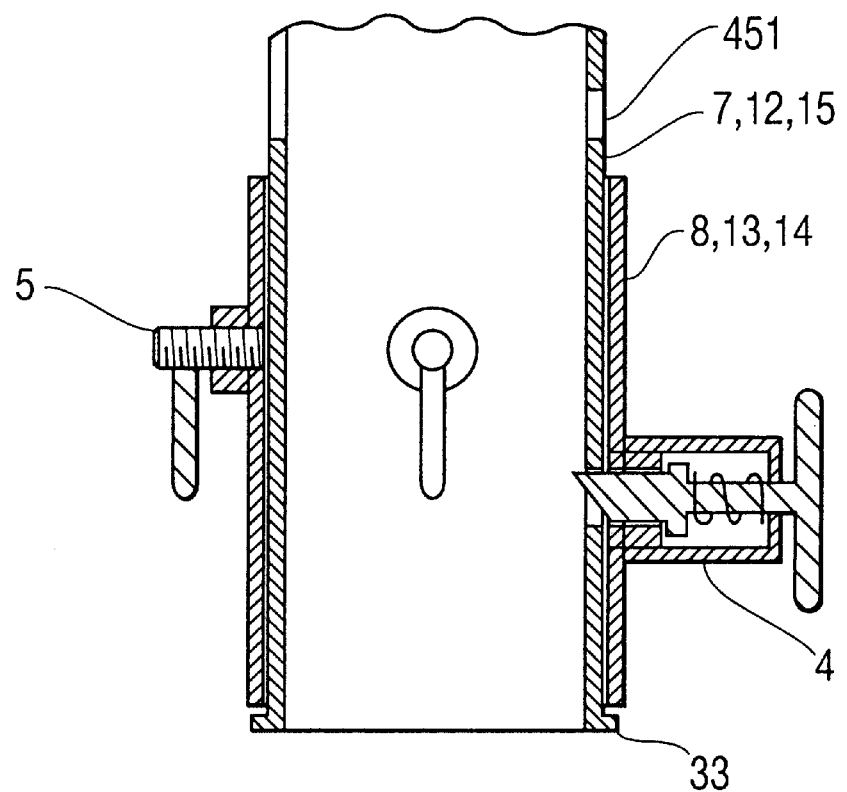
Figure 6:
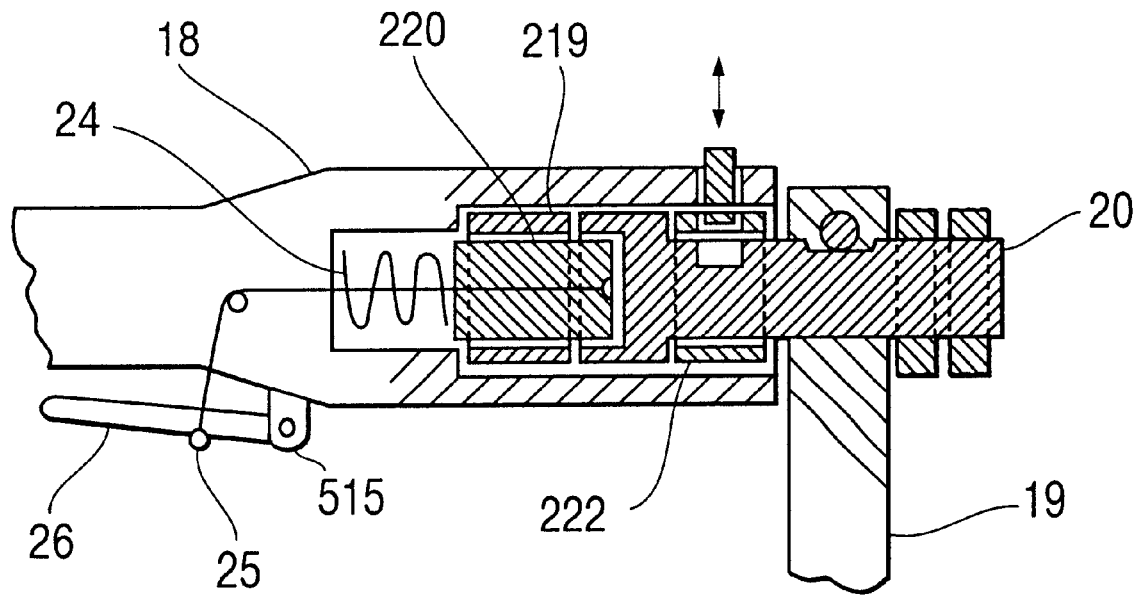
FIG. 6 is a view showing one embodiment of pedal means according to the present invention.
Figure 7A:
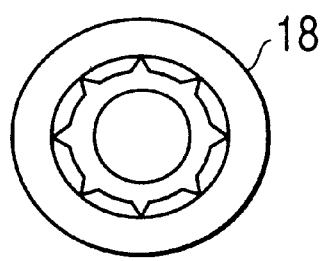
FIGS. 7a–7d are diagrammatic views showing a crank, an octagonal core, an octagonal tube and a pedal folding axle in FIG. 6, respectively.
Figure 7B:
Figure 7C:
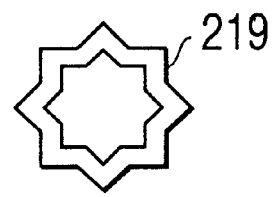
Figure 7D:
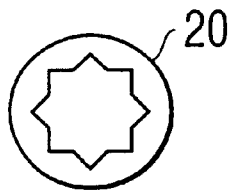

With reference now to FIGS. 5a and 5b, the structures of the axle sleeve and the axle core in the folding and telescopic frameworks of handlebar means, the girder and the saddle 16 are identical. Spring bolt 4 lies out side of three axle sleeves 8, 13 and 14, while a plurality of keyholes 451 lies in the corresponding position in three axle cores 7, 12 and 1 5, respectively. Spring bolt 4 with a beveled edge can prevent the axle cores from slide. At the out side of three axle sleeves 8, 13 and 14 is a fixed screws 5 to prevent the three axle cores 7, 12 and 15 from loosening. At the rear end of three axle cores 7, 12 and 15, bulged limit collars 33 are to used to prevent shaking off of axle cores 7, 12 and 15 from the axle sleeves 8, 13 and 14. In order to prevent the rotating of the axle cores, those three axle core sleeves are all in the shape of a square or other forms such as a hexagon.

When outspreaded, it is not necessary to loose the spring bolt 4 of the three axle sleeves (handlebar axle sleeve 8 or bicycle girder axle sleeve 13 or saddle axle sleeve 14), but just to move the axle cores (handlebar axle core 7 or bicycle axle core 12 or saddle axle core 15). Spring bolt 4 will automatically enters the keyholes 451. The fixed screws 5 is used to fasten the axle cores (handlebar axle core 7 or girder axle core 12 or saddle core 15) in the axle sleeves (handlebar axle sleeve 8 or girder axle sleeve 13 or saddle sleeve 14). When folded, the fixed screw 5 and spring bolt 4 on the axle sleeve (handlebar axle sleeve 8 or girder axle sleeve 13 or saddle sleeve 14) are loosened, and then the axle core (handlebar axle core 7 or girder axle core 12 or saddle core 15) is moved to a suitable position.

In order to illustrate the present invention, the following examples are given to show the handlebar means and pedal means used therein.

EXAMPLE 1

Pedal means i):

Referring now to FIG. 6, FIGS. 7a, 7b, 7c and 7d, pedal means comprises a medial axle 17, a crank 18, an octagonal tube 219, an octagon core 220, a folding axle 20, an assembly screw 222 and a pedal 19. The octagonal tube 219 is fixed in the octagon of the crank 18. The assembly screw 222 covers on the folding axle 20, both of them are screwed into the crank 18. The outer screw die of the screw 222 is coordinated with the inner screw die of the crank 18. The assembly screw 222 and the crank 18 are fixed by a screw pin. The inflated part of the inner end of the folding axle 20 is blocked between the octagonal tube 219 and the assembly 222, which can rotate but cannot slide away. The outer end of the folding axle 20 links up with the rotating axle of the pedal 19 and is fixed by a screw pin. The octagons of inside tracks both in the folding axle's 20 inner end and the octagonal tube 219 are identical and can be matched with each other, and the octagonal core 220 slides in their inside track's octagons under the control of a spanner handle 26, a steel wire 25 and a spring 24. When the octagonal core 220 blocks the inside track's octagons of both octagonal tube 219 and folding axle 20 at the same time, the folding axle then cannot rotate in the crank 18. One end of the spanner handle 26 is fastened on the outer wall of the crank 18 through a fixed rotating axle 515. The spring 24 withstands between the inner walls of the octagon core 220 and the crank 18. A steel wire links up with the spanner handle 26 and octagon core 220, and the directions of elastic force of the spring 24 and pull force of the steel wire 25 are opposite.

When the bicycle needs to be folded, the spanner handle 26 is driven to move the octagon core 220 out of the octagon in the folding axle 20. Thus, two pedals 19 can be turned to the middle of the bicycle body so as to reduce the width of the body. The center of the octagon core 220 deviates from that of the octagon in the folding axle 20, and is coordinated with each other to one direction in the using state. When outspreaded, the pedals are turned to the right and left (using state). The octagon core 220 will automatically insert into the octagon of the folding axle 20 under the pressure of the spring 24. Thus, the folding axle 20 cannot rotate.

EXAMPLE 2

Figure 9:
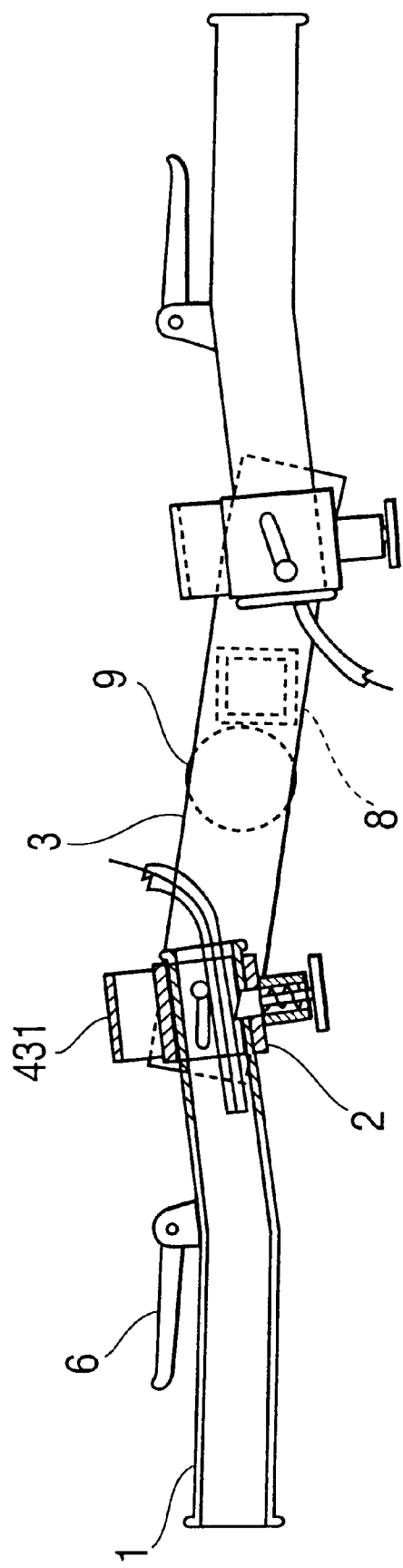
FIG. 9 is a plan view showing the outspreaded handlebar means in FIG. 8.
Figure 10:
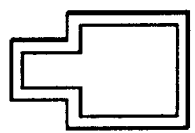
FIG. 10 is a view showing the end surface of gibbous axle sleeves of handlebar means in FIG. 8.
Figure 11:
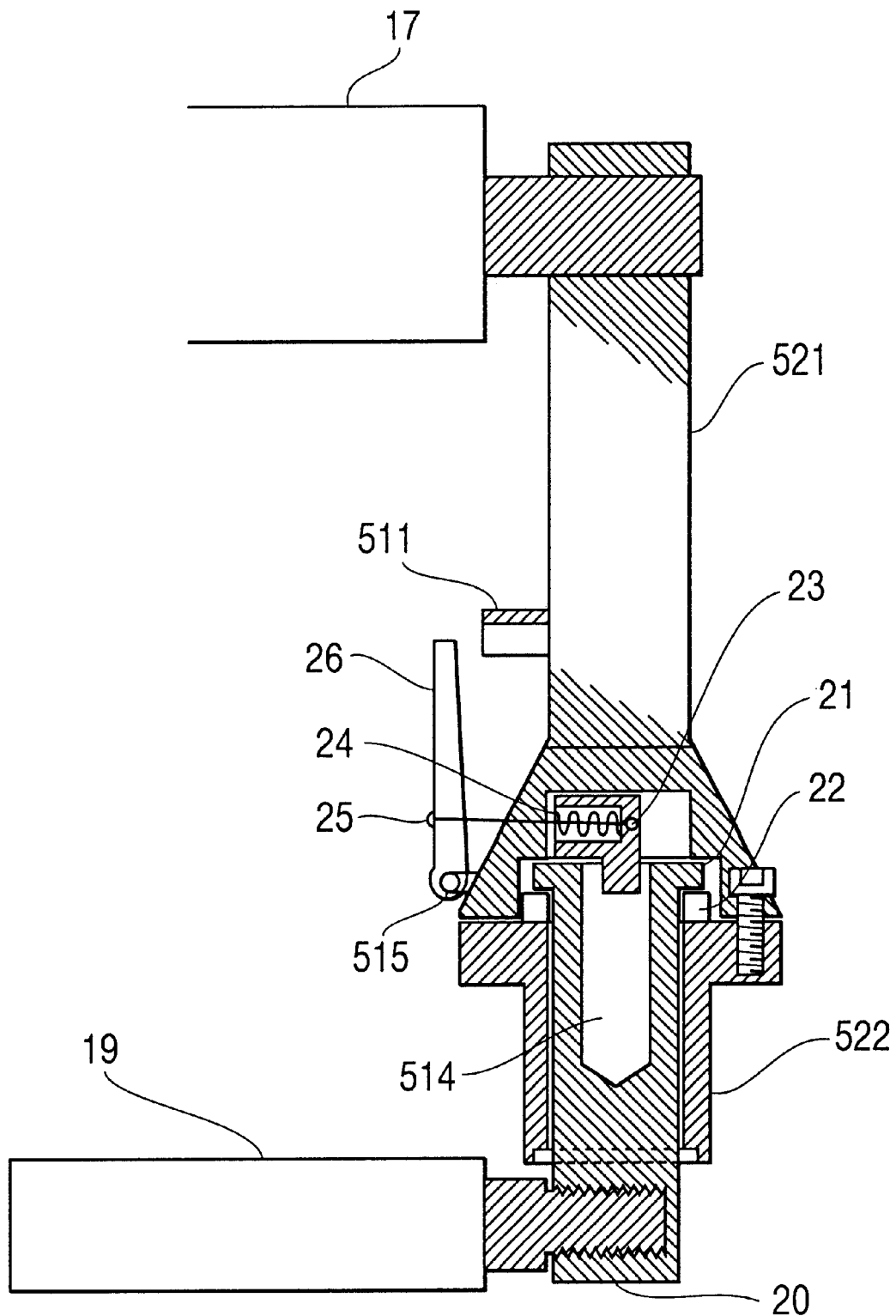
FIG. 11 is a view showing folded pedal means according to the present invention.
Figure 12:
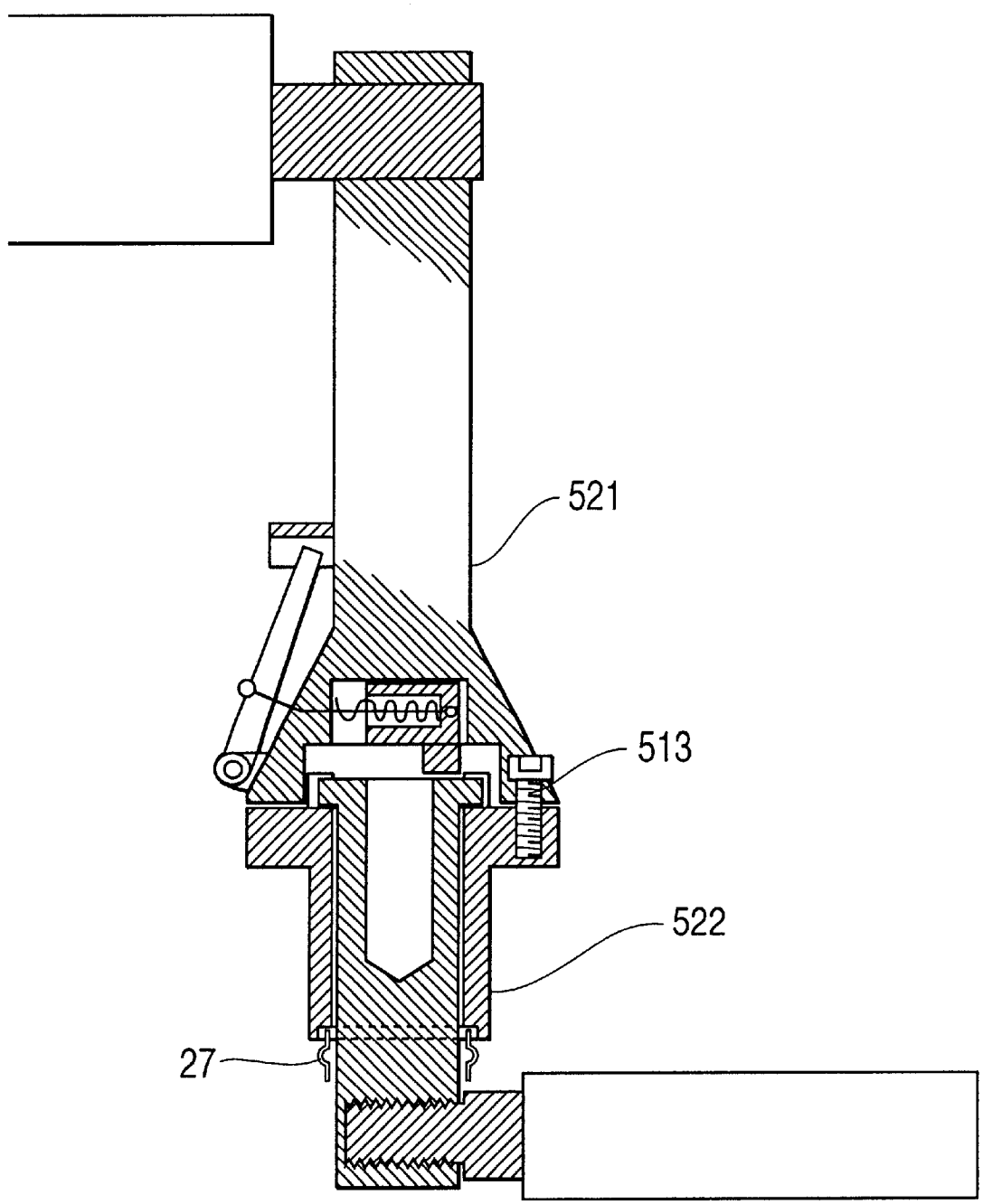
FIG. 12 is a view showing the outspreaded pedal means in FIG. 11.

Handlebar means i):

With reference to FIGS. 8, 9 and 10, handlebar means comprises a pedestal 3, right and left handlebars 1 and a handlebar axle core 7 through which the pedestal 3 is vertically connected with the upper end of the front fork standpipe 9, two gibbous axle sleeves 2 connected with the right and left ends of the pedestal 3 respectively, spring bolts 4 arranged at the side of the gibbous axle sleeves 2 and keyholes 451 being in the corresponding position of the handlebars 1. The two handlebars 1 are separated from each other, are used as axle cores to be fitted in with the gibbous axle sleeves 2 accordingly, and can slide in the gibbous axle sleeves 2. When both of the right and left handlebars 1 move to the middle, the width between the two handlebars is reduced so that the folding bicycle can occupy a smaller space when folded.

The beveled edge of the spring bolt 4 faces toward the middle of the pedestal 3. When the dead-bolt-like end surface of the spring bolt 4 inserts into the keyholes 451, handlebars 1 cannot move within the axle sleeve 2. Other means inn the prior art can be used to replace the spring 4 such as a screw bolt.

When the bicycle is unfolded to an operative condition or state, the griping sections of the two handlebars 1 fall into one straight line, while the non-griping sections thereof are inserted into the bulged axle sleeve 2. In this state, the two non-griping sections are parallel with each other and have the angles in same direction with the straight line, and two bulged axle covers 2 are placed in stagger so that two handlebars 1 may be placed to interlace when moved to the middle. The spring bolt 4 will automatically enter the keyhole under the pressure of spring 24, which is for the convenience of outspreading. The fixed screw 5 on the bulged axle sleeve 2 is used to fasten the handlebars to avoid loosening. The under part of the bulged axle sleeve 2 and the cross section of handlebars 1 are both in the shape of a square so that handlebars 1 cannot move. There are anchors in both ends of the handlebars 1 (one budge out is enough) to prevent them deviating from the budged axle sleeves 2.

When the bicycle is folded, the spring bolt 4 and fasten fixed screws 5 are loosened to make the handlebars 1 bend toward the middle so as to reduce the width between two handlebars 1. When the bicycle is outspreaded, the right and left handlebars are turned right and left, respectively. The spring bolts 4 will automatically be inserted into the keyhole of the handlebars 1 and then the fixed screws 5 are tightened.

The cross section of the gibbous axle sleeves 2 can be made in a gibbous shape. A bulgy or convex arched bridge 431 is arranged on it to passing the brake handle 6. The brake handle 6 is bent to a right angle, where it links up with the rotating axle of the handlebar 1. One part of the brake handle is out of the tube of the handlebar 1, while the other is in the tube and connected with the steel wire 408. The steel wire 408 comes out of the tube of the handlebar 1 and then is connected with the braking means.

EXAMPLE 3

Figure 13:
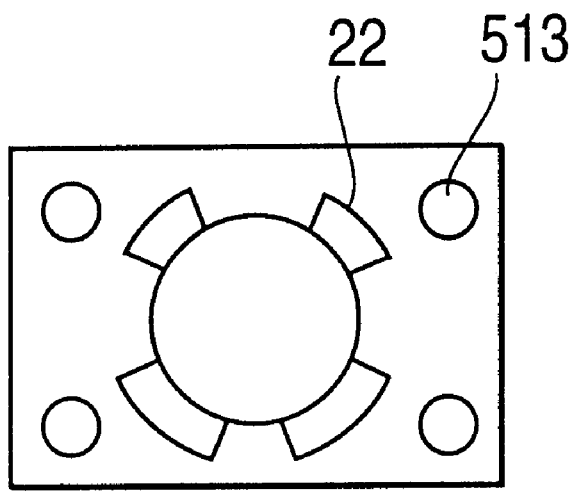
FIG. 13 is a view showing the screw hole and clamping angle of the crank in the inner end surface of the outer crank of the pedal means in FIG. 11.
Figure 14:
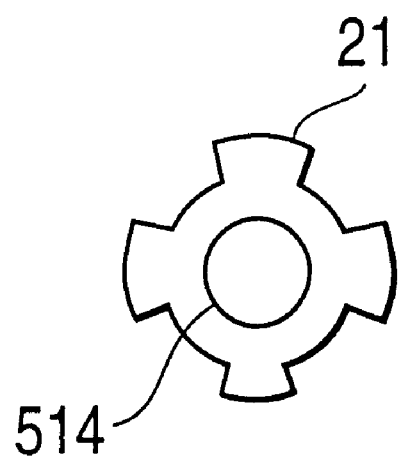
FIG. 14 is a view showing the folding axle end surface corresponding to the clamping angle of the crank in FIG. 13.

Pedal means ii),

As shown in FIGS. 11–14, pedal means comprise a medial axle 17 (the medial axle refers to the axle linking a bicycle's main body with the flying wheels), a crank 18 including an inner crank 521 and a outer crank 522, a folding axle 20 and pedals 19. The inner crank 521 and the outer crank 522 are fixed by a screw in the screw hole 513. The inner end of the inner crank 521 is connected with the axle core of the medial axle 17. The outer crank 522 has a central column-shaped through hole. One end of the folding axle 20 inserts into this columnar through hole and extends outside to link with the rotating axle of the pedal 19. The folding axle 20 can rotate in the columnar through hole and slide axially. The outer diameter of the other end of the folding axle 20 is larger than the inner diameter of the columnar through hole. The columnar through hole of the outer crank 522 and the notch formed the outer end of the inner crank 521 form a T-shaped hole. The folding axle 20 is wedged in the T-shaped hole. The clamping angle of crank 22 and the clamping angle of folding axle 21 lie at the inner side of the outer crank 522 and the inner side of the folding axle 20 respectively. The clamping angle of crank 22 and the clamping angle of folding axle 21 are engaged with each other through the sliding and rotating of folding axle 20. When they are engaged, the folding axle 20 cannot rotate in the crank 18. The folding axle 20 can rotate in the columnar through hole and slide axially. The clamping angle of the crank 22 and the clamping angle of the folding axle 21 lie in the inner side of the outer crank 522 and the inner side of the folding axle 20 respectively. The clamping angle is in the form of a saw, as shown in FIGS. 13 and 14. The clamping angle of the crank 22 and the clamping angle of the folding axle 21 are engaged with each other through the sliding and rotating of the folding axle 20. When engaged, the folding axle 20 cannot rotate in the outer crank 522, and the pedals 19 are outspreaded for use. If it is necessary to fold the bicycle, one may firstly move the clamping angle of the crank 22 and the clamping angle of folding axle 21 in the opposite direction by moving pedals 19 so that they cannot clamp with each other. Therefore, the folding axle 20 can be rotated and the pedals 19 can be moved to the middle line of the bicycle for folding. Thus, a folded bicycle will occupy much less space.

The outer end of inner crank 521 is provided with an inner notch in which a reciprocal piston-like member 23 is disposed. This member will be hereinafter be referred to as a stuff granule 23. The inner end of folding axle 20 is formed a folding axle's central cavity 514. When the stuff granule 23 is positioned in the central cavity 514, the folding axle 20 can slide axially so that the clamping angle of the crank 22 and the clamping angle of folding axle 21 are disengaged. When the stuff granule 23 is positioned around the folding axle, it will hold the folding axle 20 so that the folding axle cannot slip. In this way, the clamping angle of the crank 22 and the clamping angle of the folding axle 21 are engaged with each other so that the folding axle 20 cannot rotate. The position of the stuff granule 23 is controlled by a spring 24, a spanner handle 26 and a steel wire 25. The spring 24 is disposed between the stuff granule 23 and the inner wall of the crank 18. The steel wire 25 connects the stuff granule 23 with the spanner handle 26. One end of the spanner handle 26 is fixed in the axle 515 of the crank 18, while the other end is a movable one provided with protection boards 511.

When the bicycle is to be folded, the spanner handle 26 is pulled and the stuff granule 23 is moved to the central cavity 514 so that the folding axle 20 can move freely. The crank angle of the folding axle 21 is discharged from the crank angle of the crank 22 so that the folding axle 20 can rotate. Thus, the pedal 19 will be bent to the middle of the bicycle body so as to reduce the width between two pedals 19. The folding axle 20 can also rotate in some other ways. For instance, a spring forelock may be set on the crank 18, and a keyhole is correspondingly set on the folding axle 20. The Folding axle will not move as long as the spring forelock is inserted into the keyhole of the folding axle 20. If the bicycle is to be used, the pedal 19 may be moved in the state of use, and the folding axle 20 is moved so that two clamping angles 21, 22 are clamped with each other. Therefore, the stuff granule 23 will be moved by the spring force of the spring 24 and stuffs the folding axle 20.

The clamping angle of folding axle 21 and the clamping angle of crank 22 can work in coordination in only one direction for setting the bicycle in the condition of being used. To achieve this purpose, one of two angles, as well as the space for matching the angle is reduced or enlarged. The clamping angle of folding axle 21 also functions to prevent the folding axle 20 from deviating from the crank 18. A rubber cover 27, which is on the port of crank 18, can block sand or the like grit from entering into the round hole. A protection board or guard members 511 is provided with the spanner handle 26, for the purpose of avoiding maloperation of the spanner 26.

EXAMPLE 4

Pedal means iii).

Figure 15:
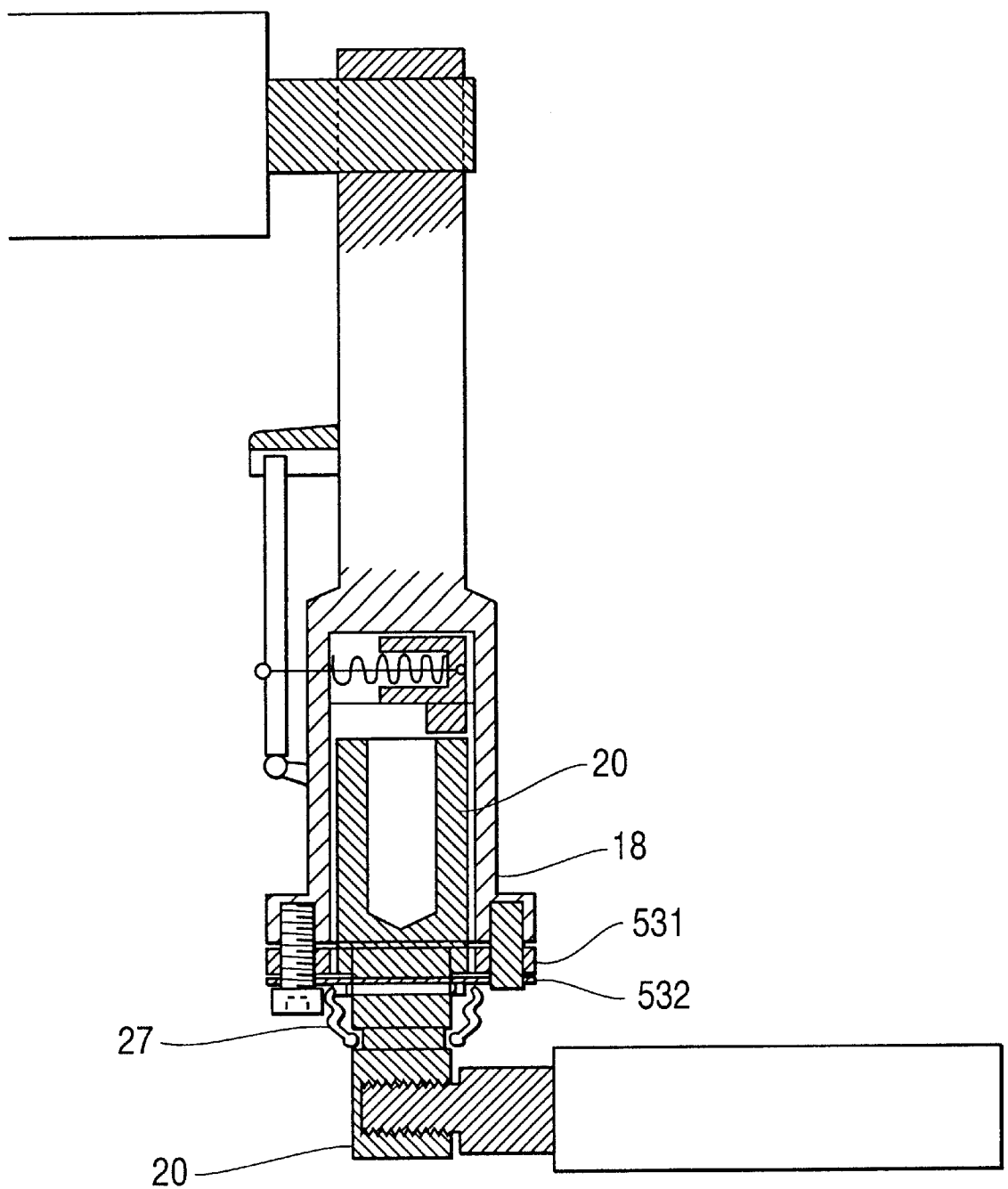
FIG. 15 is the view showing another embodiment of pedal means according to the present invention.
Figure 16:
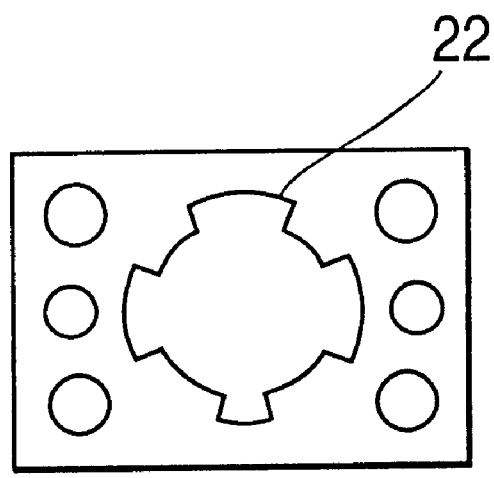
FIG. 16 is a view showing the template end surface in FIG. 15.
Figure 17:
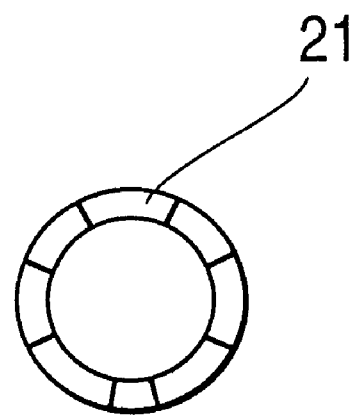
FIG. 17 is the a showing the folding axle end surface in FIG. 15.
Figure 18:
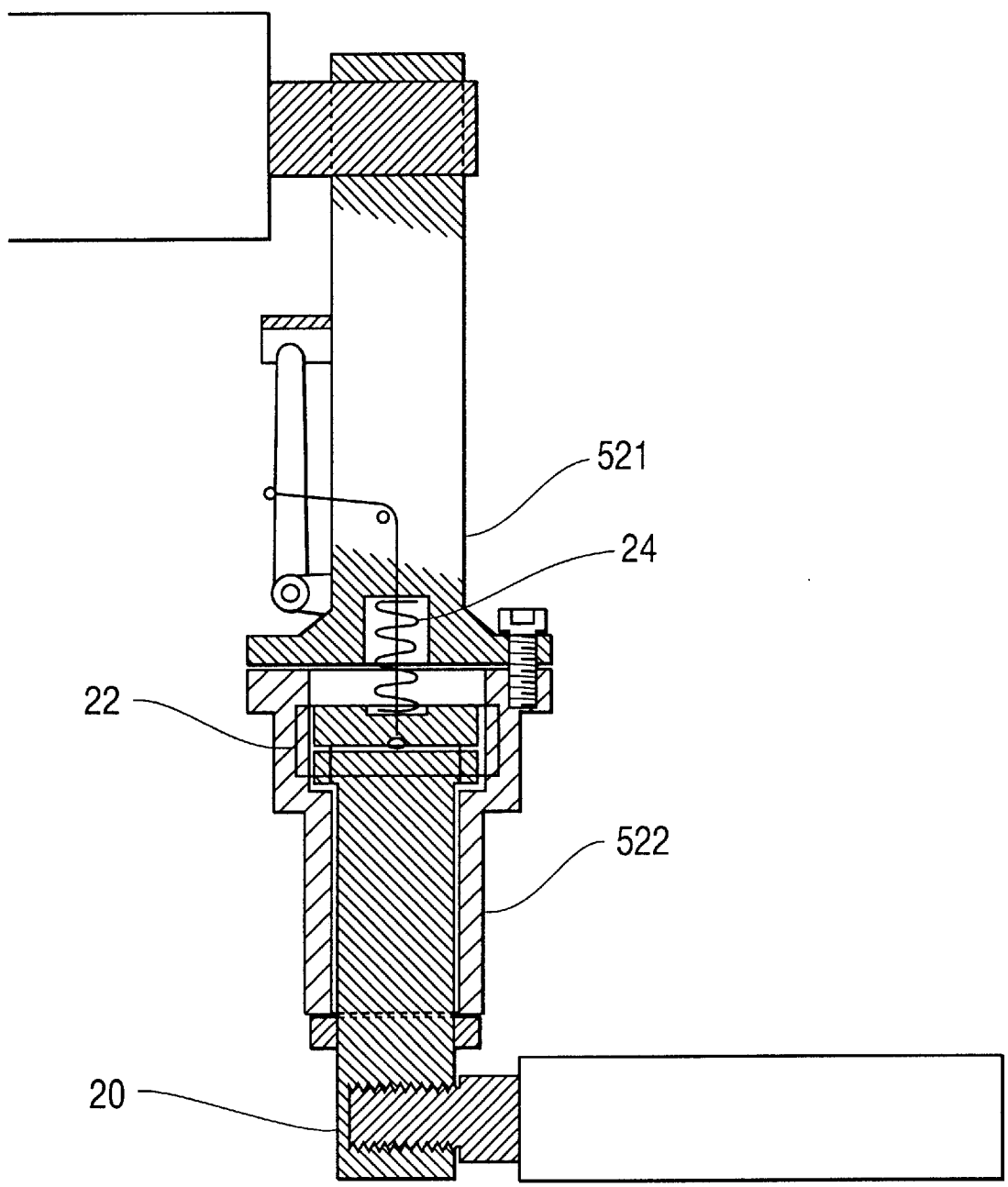
FIG. 18 is a view showing another embodiment of pedal means according the present invention.
Figure 19A:
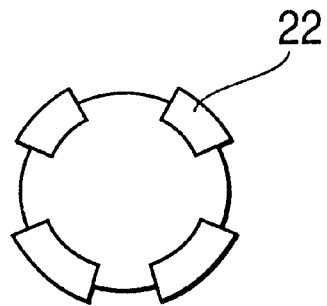
FIG. 19a is a view showing the end surface of clamping angle of the crank in FIG. 18.
Figure 19B:
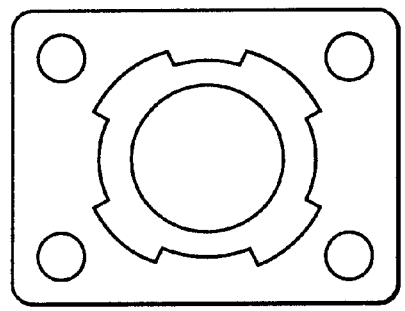
FIG. 19b is a view showing the inner end surface of the outer crank in FIG. 18.
Figure 19C:
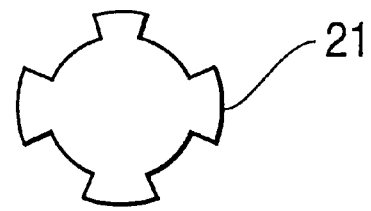
FIG. 19c is a view showing the end surface of clamping angle of the folding axle in FIG. 18.

Referring to FIGS. 15, 16 and 17, similar to Example 3, the crank 18 includes one template 531, which is fixed at the outer end of the crank 18 by screws. The clamping angle of the crank 22 lies on the template 531. Accordingly, the clamping angle of the folding axle 21 lies at the outer end of the folding axle 20. FIG. 16 shows the cross section to show the end surface of the template 531. FIG. 17 shows the cross section of the end surface of the folding axle 20. In this embodiment, another function of the template 531 is to block bench in clamping angle of the folding axle 21 so that the folding axle 20 will not deviate from the crank.

In this embodiment, the clamping angle 22 can also lie at the outer end surface of the crank 18. No clamping angle should be set on the template 531, which is used to prevent the folding axle 20 from sliding.

EXAMPLE 5

Pedal means iv).

As shown in FIGS. 18, 19a–c, pedal means are arranged in the way that the clamping angle 22 can move only along the inner wall of the outer crank 522, and the folding axle 20 can rotate only in the through hole of the outer crank 522. The step formed at the clamping angle of folding axle 21 and the screw nut in the outer end of the folding axle 20 will block the inner and outer ends of the outer crank 522 respectively. The clamping angle of the crank 22 engages with the clamping angle of the folding axle 21 by the spring force of the spring 24. When the clamping angle of crank 22 is moved, the folding axle 20 can rotate accordingly.

EXAMPLE 6

Handlebar means ii).

Figure 20A:
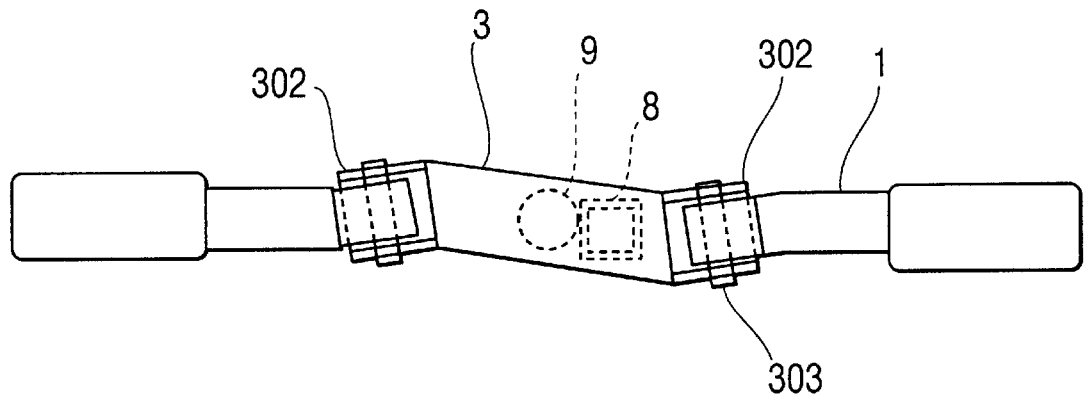
FIG. 20a is a view showing another embodiment of handlebar means in the outspreaded state according to the present invention.
Figure 20B:
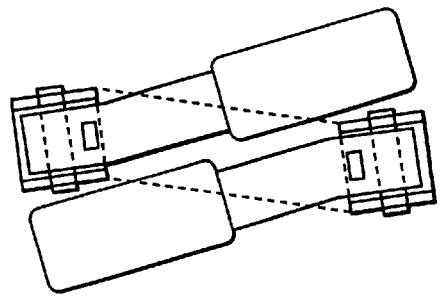
Figure 20C:
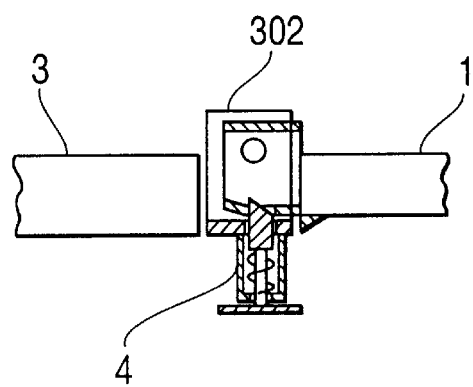

As shown in FIGS. 20a, 20b and 20c, handlebar means includes handlebars 1, a U-shaped frame, a handlebar folding axle 303 and a spring bolt 4. The middle part of the U-shaped frame is called as pedestal 3, while the two ends of the U-shaped frame are U grooves 302. The openings of the U grooves are in upward direction and handlebars 1 are fixed rotatably in the corresponding the U grooves through the handlebar folding axle 303. The griping sections of the two handlebars are aligned and non-griping sections, together with the parts inserted in the U grooves, are arranged in an angle to the griping section. The handlebars 1 can rotate around the handlebar folding axle 303 in the U grooves 302. The pedestal 3 is vertically fixed on the front fork standpipe 9 through the handlebar axle core 7. Two U grooves 302 have an angle with the axis of the griping section of each handlebar, respectively, in opposite direction. The hemline of the U groove 302 links up with the spring bolt 4. The keyhole 451 is formed at the corresponding position of the handlebar 1. The bolt tongue can insert into the keyhole 451 under the bias of the spring so that the handlebar 1 cannot rotate. When the spring bolt 4 is pulled out, two handlebars 1 can rotate in the U-shaped frame so that they can be staggered at the same level. The beveled edge of the spring bolt 4 faces outward. The ends of the handlebars 1 may abut against the bottom of the U groove 302 so that they cannot be turned downward.

What is claimed is:

1. A folding bicycle comprising:

handlebar means comprising two handlebars (1) which are both foldable from an operative position to a storage position;

girder means comprising a front pipe (11), a girder axle core (12) and a girder axle sleeve (13);

a front fork standpipe (9);

a front wheel (10);

a rear wheel (32);

a saddle (16); and pedal means, wherein said girder axle core (12), whose front end is connected with said front pipe (11), may move fore-and-aft inside the girder axle sleeve (13); the front fork standpipe (9) which extends through the girder front pipe (11) for supporting the front wheel (10), may rotate around an axis thereof; and the axis of the girder front pipe (11) is located rear of an axis of rotation of the front wheel (10) so that the front wheel (10) can be rotated and folded backward so as to extend along beside said girder axle core (12) when the handlebars are both folded in their storage positions.

2. A folding bicycle in accordance with claim 1, wherein said handlebar means further comprises a handlebar axle core (7) a handlebar axle sleeve (8) in which the handlebar axle core (7) can move up and down; and wherein said saddle (16) comprises a saddle axle core (15) and saddle axle sleeve (14) in which the saddle axle core (15) can move up and down.

3. A folding bicycle comprising:

handlebar means comprising handlebars (1);

girder means comprising a front pipe (11), a girder axle core (12) and a girder axle sleeve (13);

a front fork standpipe (9);

a front wheel (10);

a rear wheel (32);

a saddle (16); and pedal means, wherein said girder axle core (12), whose front end is connected with said front pipe (11), may move fore-and-aft inside the girder axle sleeve (13); the front fork standpipe (9) which extends through the girder front pipe (11) for supporting the front wheel (10), may rotate around an axis thereof; and the axis of the girder front pipe (11) is located rear of an axis of rotation of the front wheel (10) so that the front wheel (10) can be rotated and folded backward, wherein said pedal means comprises:

a) a medial axle (17), a crank (18), an octagonal tube (219), an octagonal core (220), a pedal folding axle (20), an assembly screw (222), a pedal (19), a spanner handle (26), a steel wire (25) and a spring (24), wherein said octagonal tube (219) is fixed to the crank (18), the assembly screw (222) encloses the folding axle (20), both of the octagonal tube (219) and the assembly screw (222) are screwed into the crank (18); the outer screw die of the crank (18) is coordinated with the inner screw die thereof; the assembly screw (222) and the crank (18) are fixed by a screw pin; the inflated part of the folding axle's (20) inner end is blocked between the octagonal tube (219) and the assembly (222) and can only rotate and cannot slide; the outer end of the folding axle (20) fixed by a screw pin, is connected with the axle of the pedal (19); octagons of inside tracks in both of folding axle's (20) inner end and the octagonal tube (219) are identical and may be matched with each other; and the octagonal core (220) slides in their inside track's octagons under the control of the spanner handle (26), the steel wire (25) and the spring (24) so that when the octagonal core (220) blocks the inside track's octagons of both octagonal tube (219) and the folding axle (20) at the same time, the folding axle (20) cannot rotate in the crank (18); or b) a medial axle (17), a crank (18) comprising a inner crank (521) and a outer crank (522), a pedal (19) and a folding axle (20), wherein said medial axle (17) is connected with the main body of the bicycle through its axle sleeve, the inner end of the crank (18) joints with the axle core of the medial axle (17), while its outer end joints with the pedal (19); said crank (521) and outer crank (522) are both fixed by screws; one end of the folding axle (20) is inserted into a columnar through hole formed in said outer crank (522), stretches out of the outer end thereof, and is connected with the rotating axle of the pedal (19); the crank (20) is connected with the pedal (19) through the folding axle (20); another end of the outer diameter of the folding axle's (20) is larger than the inner diameter of the columnar through hole positioned in the middle of the outer crank (522) which forms a T-shaped round hole together with a notch in the outer end of the inner crank (521); the folding axle (20) is wedged in the T-shaped round hole; the clamping angle of the crank (22) and the clamping angle of folding axle (21), which are teeth-like, lie in the inner side of the outer crank (522) and inner side of the folding axle (20), respectively; the clamping angle of the crank (22) and the clamping angle of the folding axle (21) are engaged with each other through the sliding and rotating of the folding axle (20) and when they are engaged, the folding axle (20) cannot rotate in the crank (18); a stuff granule (23) is arranged in the notch space of the inner crank (521) and a folding axle's central cavity (514) is positioned in the inner end of the folding axle (20); when the stuff granule (23) lies in the central cavity (514), the folding axle (20) can slide in an axial direction so that the clamping angle of the crank (22) and the clamping angle of the folding axle (21) are disengaged, and when the stuff granule (23) lies all around the folding axle, it will hold out against the folding axle (20) so that it cannot slide away, while the clamping angle of the crank (22) and the clamping angle of the folding axle (21) are engaged with each other so that the folding axle (20) cannot rotate; the position of the stuff granule (23) is adjusted by a spring (24), a spanner handle (26) and a steel wire (25); and said spring (24) is disposed between the stuff granule (23) and the crank's (18) inner wall; and said steel wire (25) is connected with both the stuff granule (23) and the spanner handle (26), one end of which is fastened in the fixed rotating axle (515) of the crank (18) and the other one being movable is rounded with a protection board (511).

4. A folding bicycle in accordance with claim 3 wherein said handlebar means comprises a pedestal (3), right and left handlebars (1) and a handlebar axle core (7) through which said pedestal (3) is vertically connected with the upper end of the front fork standpipe (9), and wherein said handlebar means further comprises:

two gibbous axle sleeves (2) connected with the right and left ends of the pedestal (3) respectively, wherein said two handlebars (1) are separated from each other, are used as axle cores to be fitted in with the gibbous axle sleeves (2) accordingly, and can slide in the said gibbous axle sleeves (2);

spring bolts (4) arranged at the side of the gibbous axle sleeves (2) and keyholes (451) being in the corresponding position of the handlebars (1), wherein the beveled edge of the spring bolt (4) faces toward the middle of the pedestal (3), the cross section of the gibbous axle sleeves (2) is in the gibbous shape and that of the handlebars (1) is in the shape of a square, and the handlebars (1) are located in the gibbous axle sleeves (2);

a bulgy arched bridge (431) positioned on the gibbous axle sleeves (2), through which a brake handle 6 can pass; and a fixed screw (5) on the gibbous axle sleeves (2), wherein when the bicycle is outspreaded, the gripping sections of the two handlebars (1) lie in one straight line, while the non-gripping sections thereof which are parallel with each other and form the same angle with the straight line are put into the bulged axle sleeve (2) which are staggered so that two handlebars (1) interlace after they move to the middle; or a U-shaped frame comprising U-shaped grooves (302), handlebar folding axles (303), and spring bolts (4), wherein the two handlebars (1) are mounted into said U-shaped grooves (302) having openings upward at the two ends of the pedestal (3) respectively and fixed by the folding axle (303); the gripping sections of the two handlebars (1) fall into one straight line, while non-gripping sections in the U-shaped grooves (302) staggered and are angled in the same direction as the straight line; and the two handlebars (1) can be folded in stagger when they are turned upward and to the middle in the U-shaped frame.

5. A folding bicycle in accordance with claim 3, wherein said handlebar means further comprises a handlebar axle core (7) and a handlebar axle sleeve (8) in which the handlebar axle core (7) can move up and down; and wherein said saddle (16) comprises a saddle axle core (15) and a saddle axle sleeve (14) in which the saddle axle core (15) can move up and down.

6. A folding bicycle in accordance with claims 4, wherein said handlebar means further comprises a handlebar axle core (7) and a handlebar axle sleeve (8) in which the handlebar axle core (7) can move up and down; and wherein said saddle (16) comprises a saddle axle core (15) and a saddle axle sleeve (14) in which the saddle axle core (15) can move up and down.

7. A folding bicycle comprising:

handlebar means comprising handlebars (1);

girder means comprising a front pipe (11), a girder axle core (12) and a girder axle sleeve (13);

a front fork standpipe (9);

a front wheel (10);

a rear wheel (32);

a saddle (16); and pedal means, wherein said girder axle core (12), whose front end is connected with said front pipe (11), may move fore-and-aft inside the girder axle sleeve (13); the front fork standpipe (9) which extends through the girder front pipe (11) for supporting the front wheel (10), may rotate around an axis thereof; and the axis of the girder front pipe (11) is located rear of an axis of rotation of the front wheel (10) so that the front wheel (10) can be rotated and folded backward, wherein said handlebar means comprises a pedestal (3), right and left handlebars (1) and a handlebar axle core (7) through which said pedestal (3) is vertically connected with the upper end of the front fork standpipe (9), wherein said handlebar means further comprises:

two gibbous axle sleeves (2) connected with the right and left ends of the pedestal (3) respectively, wherein said two handlebars (1) are separated from each other, are used as axle cores to be fitted in with the gibbous axle sleeves (2) accordingly, and can slide in the said gibbous axle sleeves (2);

spring bolts (4) arranged at the side of the gibbous axle sleeves (2) and keyholes (451) being in the corresponding position of the handlebars (1), wherein the beveled edge of the spring bolt (4) faces toward the middle of the pedestal (3), the cross section of the gibbous axle sleeves (2) is in the gibbous shape and that of the handlebars (1) is in the shape of a square, and the handlebars (1) are located in the gibbous axle sleeves (2);

a bulgy arched bridge (431) positioned on the gibbous axle sleeves (2), through which a brake handle 6 can pass; and a fixed screw (5) on the gibbous axle sleeves (2), wherein when the bicycle is outspread, the griping sections of the two handlebars (1) lie in one straight line, while the non-griping sections thereof which are parallel with each other and form the same angle with the straight line are put into the bulged axle sleeve (2) which staggered so that two handlebars (1) may be interlaced after they move to the middle; or a U-shaped frame comprising U-shaped grooves (302), handlebar folding axles (303), and spring bolts (4), wherein the two handlebars (1) are mounted into said U-shaped grooves (302) having openings upward at the two ends of the pedestal (3) respectively and fixed by the folding axle (303); the griping sections of the two handlebars (1) fall into one straight line, while non-griping sections in the U-shaped grooves (302) are staggered and are angled in the same direction as the straight line; and the two handlebars (1) can be folded into a staggered configuration when they are turned upward and to the middle in the U-shaped frame.

8. A folding bicycle in accordance with claim 7, wherein said handlebar means further comprises a handlebar axle core (7) and a handlebar axle sleeve (8) in which the handlebar axle core (7) can move up and down; and wherein said saddle (16) comprises a saddle axle core (15) and a saddle axle sleeve (14) in which the saddle axle core (15) can move up and down.

* * * * *